United States Patent
Watanabe

(10) Patent No.: US 8,164,635 B2
(45) Date of Patent: Apr. 24, 2012

(54) VIBRATION CORRECTION CONTROL CIRCUIT FOR CORRECTING DISPLACEMENT OF OPTICAL AXIS CAUSED BY VIBRATION, AND IMAGE PICKUP APPARATUS PROVIDED WITH SAID VIBRATION CORRECTION CONTROL CIRCUIT

(75) Inventor: Tomofumi Watanabe, Gifu (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 129 days.

(21) Appl. No.: 12/816,054

(22) Filed: Jun. 15, 2010

(65) Prior Publication Data
US 2010/0315519 A1   Dec. 16, 2010

(30) Foreign Application Priority Data
Jun. 15, 2009   (JP) .................................. 2009-142650

(51) Int. Cl.
*H04N 5/225* (2006.01)

(52) U.S. Cl. ................................................. 348/208.11

(58) Field of Classification Search ............. 348/208.99, 348/208.4, 208.5, 208.7, 208.11; 359/554, 359/557; 396/55
See application file for complete search history.

(56) References Cited

U.S. PATENT DOCUMENTS

| | | | | |
|---|---|---|---|---|
| 6,343,188 B1* | 1/2002 | Morofuji | ........................ | 396/55 |
| 6,987,529 B1* | 1/2006 | Ito | .............................. | 348/208.2 |
| 7,424,212 B2* | 9/2008 | Ebato | ............................. | 396/53 |
| 2007/0154195 A1* | 7/2007 | Irisawa et al. | ................... | 396/55 |

FOREIGN PATENT DOCUMENTS

| | | |
|---|---|---|
| JP | 2006-126712 | 5/2006 |
| JP | 2008-191615 | 8/2008 |

* cited by examiner

*Primary Examiner* — Jason Whipkey
(74) *Attorney, Agent, or Firm* — McDermott Will & Emery LLP

(57) ABSTRACT

In a vibration correction control circuit mounted on an image pickup apparatus including an image pickup unit, provided with lenses, image pickup devices and vibration detecting element, and a driver element for adjusting the position of the image pickup unit, the equalizer generates a drive signal used to move the image pickup unit in a direction along which to reduce the vibration applied to the image pickup unit, based on the output signal of the vibration detecting element. A verifying-signal input circuit supplies a dummy vibration-component signal to the equalizer.

4 Claims, 5 Drawing Sheets

VIBRATION CORRECTION CONTROL CIRCUIT FOR CORRECTING DISPLACEMENT OF OPTICAL AXIS CAUSED BY VIBRATION, AND IMAGE PICKUP APPARATUS PROVIDED WITH SAID VIBRATION CORRECTION CONTROL CIRCUIT

CROSS-REFERENCE TO RELATED APPLICATIONS

This application is based upon and claims the benefit of priority from the prior Japanese Patent Applications No. 2009-142650, filed on Jun. 15, 2009, the entire contents of which are incorporated herein by reference.

BACKGROUND OF THE INVENTION

1. Field of the Invention

The present invention relates to a vibration correction control circuit for correcting a displacement of the optical axis caused by vibration such as camera shake, and an image pickup apparatus that includes said vibration correction control circuit.

2. Description of the Related Art

Digital still cameras and digital movie cameras (hereinafter generically referred to as "digital cameras") have been widely used by general users. Various methods for correcting camera shake are proposed for users who are not familiar with how to handle the cameras properly and therefore are likely to encounter camera shake when taking pictures. Among those digital cameras available, there is one, mounted on a mobile phone, which serves as one of functions in the mobile telephone and a certain type of them are so designed that the camera is held by one hand only. In such devices operated by a thumb in one hand, the shake is more likely to occur as compared with commonly used cameras held by two hands to take pictures.

An electronic method and an optical method are available to correct such a shake. An typical example of the optical shake correction is a lens-shift method. In the lens-shift method, the optical axis is corrected as follows. That is, the lens position is moved in such a direction as to cancel out the displacement caused by the vibration applied to a camera. The lens-shift method requires a vibration detecting element, such as a gyro sensor, for detecting the vibration applied to the camera and a position detecting element, such as a hall element, for detecting the lens position.

In a conventionally known technique, the shake is corrected by moving the entire image pickup unit on which the lens, the image pickup devices and the vibration detecting element are mounted. This method requires no position detecting element, so that a control system can be simplified.

Electronic equipment, such as digital cameras, which contains LSIs mounted therein needs to be subjected to operation verification before they are shipped out of a manufacturing site. Similarly, an image pickup apparatus also needs to be subjected to operation verification wherein the image pickup apparatus includes the aforementioned vibration detecting element, a driver element for adjusting the position of the aforementioned image pickup unit, and a vibration correction control circuit for generating a drive signal, used to drive the driver element, from a vibration component detected by the vibration detecting element.

SUMMARY OF THE INVENTION

A vibration correction control circuit according to one embodiment of the preset invention is installed in an image pickup apparatus including: an image pickup unit provided with a lens, image pickup devices and a vibration detecting element; and a driver element for adjusting the position of the image pickup unit, and the vibration correction control circuit comprises: an equalizer configured to generate a drive signal used to move the image pickup unit in a direction along which to reduce vibration applied to the image pickup unit, based on an output signal of the vibration detecting element, and configured to output the drive signal to the driver element; and a verifying-signal input circuit configured to input a dummy vibration-component signal to the equalizer.

Another embodiment of the present invention relates to an image pickup apparatus. The image pickup apparatus comprises: an image pickup unit including a lens, image pickup devices, and a vibration detecting element; a driver element for adjusting the position of the image pickup unit; and a vibration correction control circuit. The driver element moves the image pickup unit, according to a drive signal supplied from the vibration correction control circuit.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
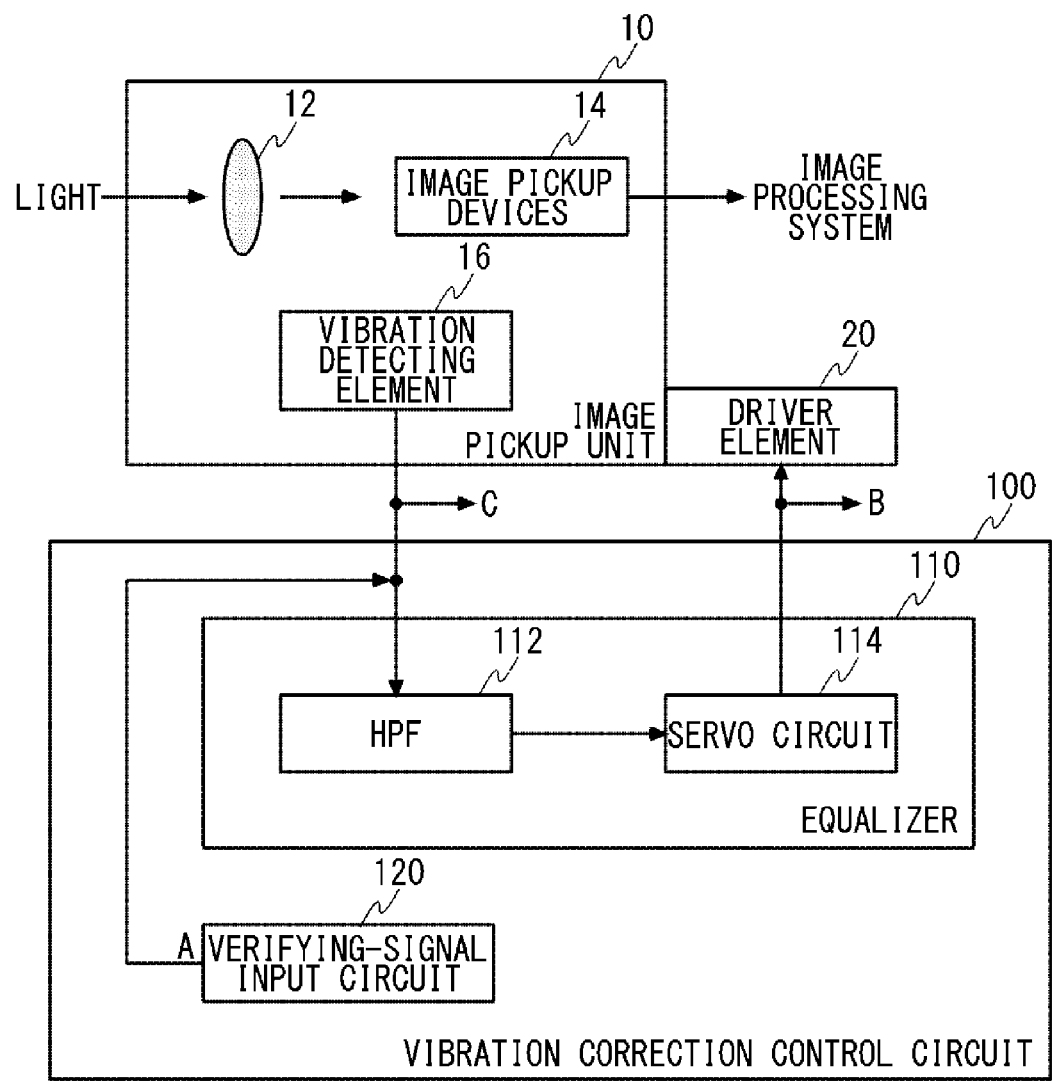
FIG. 1 illustrates a structure of an image pickup apparatus provided with a vibration correction control circuit according to an embodiment of the present invention.

FIG. 1 illustrates a structure of an image pickup apparatus 500 provided with a vibration correction control circuit according to an embodiment of the present invention. The image pickup apparatus 500 includes an image pickup unit 10, a driver element 20, and a vibration correction control circuit 100. Here, other structural components, such as an image processing system and a recording medium, which are not related to the vibration correction processing in the image pickup unit 10 are omitted in Figures and also omitted in the following description.

The image pickup unit 10 is equipped with a lens 12, image pickup devices 14, and a vibration detecting element 16. The lens 12, the image pickup devices 14 and the vibration detecting element 16 are all fixed to the image pickup unit 10 and therefore the relative positions thereof to each other remain fixed. It goes without saying that the lens 12 and the like may be moved due to the running of a system or a user operation such as auto-focus adjustment and aperture adjustment; however, these factors are not considered in the present embodiment. Note that the vibration correction control circuit 100 may be fixed to the image pickup unit 10 or it may be fixed to a body side of the image pickup apparatus 500.

The image pickup devices 14 convert the light signals transmitted through the lens 12, which is an optical component, into electric signals and outputs the electric signals to a not-shown image processing system. The image pickup devices 14 may be CCD (charge-coupled device) sensors or CMOS (complementary metal-oxide semiconductor) image sensors.

The vibration detecting element 16 detects the vibration applied to the image pickup unit 10. A gyro sensor may be used as the vibration detecting element 16. This gyro sensor detects the angular velocities in two-axis or three-axis directions of the image pickup unit 10. In the present embodiment, the gyro sensor detects the angular velocities in the yaw and pitch directions of the image pickup unit 10. An angular velocity signal obtained by the gyro sensor is amplified by a not-shown amplifier circuit and then the amplified signal is outputted to an equalizer 110 of the vibration correction control circuit 100. Note that if an angular velocity signal is outputted in the form of analog values from the gyro sensor, the analog angular velocity signal will be converted into digital values by a not-shown A-D converter and then inputted to the equalizer 110.

The driver element 20, which is an element used to adjust the position of the image pickup unit 10, moves the image pickup unit 10 in response to a drive signal supplied from the vibration correction control circuit 100. The driver element 20 may be a voice coil motor (VCM). The voice coil motor moves the image pickup unit 10 in the two-axis or three-axis directions. In the present embodiment, the VCM moves the image pickup unit 10 in the yaw and pitch directions.

The driver element 20 moves the image pickup unit 10 in such a direction as to cancel out vibration components applied to the image pickup apparatus 500 so that the attitude and position of the image pickup unit 10 can be maintained even if the attitude and position of the image pickup apparatus 500 is varied due to a shake. That is, the driver element 20 functions as a seismic isolation system or the like for the image pickup unit 10.

The vibration correction control circuit 100 includes an equalizer 110 and a verifying-signal input circuit 120. The equalizer 110 generates a drive signal used to move the image pickup unit 10 in such a direction as to cancel out the vibration applied to the image pickup unit 10, based on an output signal of the vibration detecting element 16, and sets the drive signal to the driver element 20. That is, the equalizer 110 generates the drive signal by which the attitude and position of the image pickup unit 10 can be kept constant even if the attitude and position of the image pickup apparatus 500 is varied due to a shake.

A detailed description will now be given hereinbelow. The equalizer 110 includes a high-pass filter (HPF) 112 and a servo circuit 114. In the present embodiment, digital values are used when the equalizer 110 undergoes signal processing.

The angular velocity signals outputted from the vibration detecting element 16 are inputted to the HPF 112. Out of the angular velocity signals outputted therefrom, the HPF 112 removes frequency components thereof lower than the frequency components due to the shake. In general, the frequency components due to the shake lie in the range of 1 to 20 Hz, so that those less than or equal to 0.7 Hz, for instance, are removed from the angular velocity signals.

The servo circuit 114 generates a signal by which to cancel out the vibration components, due to a shake, which are identified by the angular velocity signals inputted from the HPF 112. That is, the servo circuit 114 generates a signal whose phase is opposite to that of the angular velocity signal. The signal generated by the servo circuit 114 is supplied to the driver element 20 as the drive signal.

Note that the vibration detecting element 16, the equalizer 110 and the driver element 20 are provided for each axis to be corrected. In the present embodiment, there are provided a yaw-direction vibration detecting element 16, a yaw-direction equalizer 110 and a yaw-direction driver element 20 which are used to correct the movements in the yaw direction, and there are provided a pitch-direction vibration detecting element 16, a pitch-direction equalizer 110 and a pitch-direction driver element 20 which are used to correct the movements in the pitch direction.

The verifying-signal input circuit 120 inputs a dummy vibration-component signal to the equalizer 110 as a verifying signal. Here, this dummy vibration-component signal may also be called or referred to as a simulated vibration-component signal. For example, a sine wave is inputted to the equalizer 110 as the verifying signal. In the present embodiment, the verifying signal is inputted to a path (point A in FIG. 1) between the vibration detecting element 16 and the HPF 112. Note that the configuration employed in which the verifying signal is inputted is not limited to the above-described one in which it is inputted to the point A and it is desirable as long as the verifying signal is inputted to any point on the path leading from the vibration detecting element 16 to the driver element 20

Figure 2:
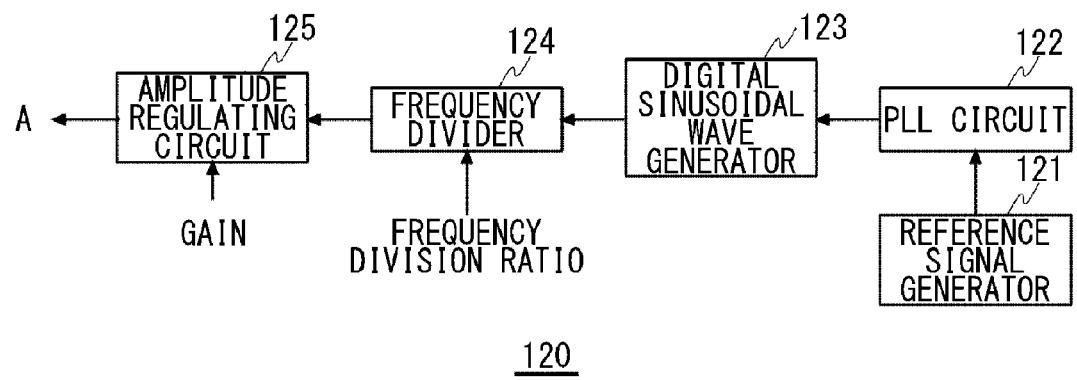
FIG. 2 illustrates an exemplary structure of a verifying-signal input circuit according to an embodiment of the present invention.

FIG. 2 illustrates an exemplary structure of the verifying-signal input circuit 120 according to an embodiment. This verifying-signal input circuit 120 is configured such that at least one of the amplitude of sine wave and the frequency thereof can be adjusted according to an instruction given externally. The verifying-signal input circuit 120 includes a reference signal generator 121, a PLL circuit 122, a digital sine wave generator 123, a frequency divider 124, and an amplitude adjustment circuit 125. It is not indispensable that the reference signal generator 121 and the PLL circuit 122 be mounted on the verifying-signal input circuit 120. Instead, those incorporated into another LSI mounted on the image pickup apparatus 500 may be used to replace them.

The reference signal generator 121 is constituted by a crystal oscillator or the like. Here, the reference signal generator 121 oscillates the reference signal having a frequency of 12.6 MHz. The PLL circuit 122 outputs a clock signal generated by multiplying the reference signal fed from the reference signal generator 121. In the present embodiment, the PLL circuit 122 outputs a clock signal of 40 MHz here.

The digital sine wave generator 12 generates digital sine wave signals, based on the clock signal supplied from the PLL circuit 122. In other words, the digital sine wave generator 12 generates a sine wave signal that expresses the amplitude value of each time point by a digital value. The frequency divider 124 divides the digital sine wave signal supplied from the digital sine wave generator 123, by a dividing ratio set externally. The amplitude adjustment circuit 125 adjusts the amplitude value of the digital sine wave signal supplied from the frequency divider 124, with a gain set externally.

The dividing ratio and the gain can be set for the above-described image pickup apparatus 500 by an inspection apparatus (e.g., PC) connected externally. The inspection apparatus detects the output signal (point C in FIG. 1) of the vibration detecting element 16 with a verifying-signal being inputted to the equalizer 110 from the verifying-signal input circuit 120. Thereby, the operations of the vibration detecting element 16, the equalizer 110 and the driver element 20 can be verified. At the same time, whether there is any wiring defect there between can be inspected. Also, the inspection apparatus detects the output signal (point B in FIG. 1) of the equalizer 110 with a verifying-signal being inputted to the equalizer 110 from the verifying-signal input circuit 120. Thereby, the operation verification of the equalizer 110 can be conducted.

Figure 3:
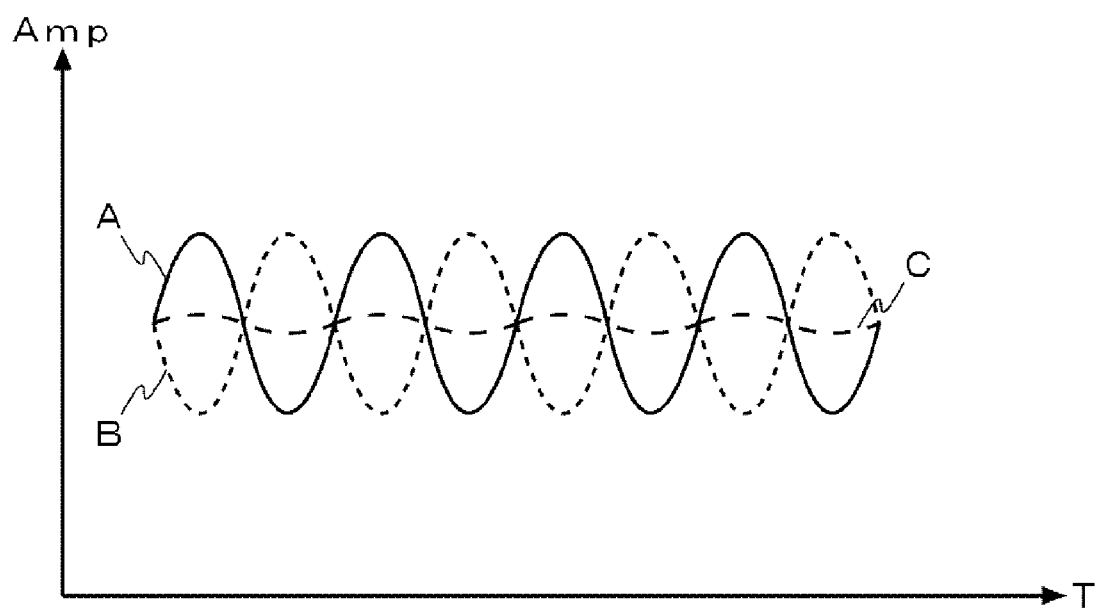
FIG. 3 illustrates examples of a verifying signal (waveform A) inputted to point A, an observation signal (waveform B) at point B, and an observation signal (waveform C) at point C in an embodiment of the present invention.

FIG. 3 illustrates examples of a verifying signal (waveform A) inputted to point A, an observation signal (waveform B) at point B, and an observation signal (waveform C) at point C in an embodiment of the present invention. For ease of explanation, analog signals are used in FIG. 3 but the actual signals are in digital form.

The above-described image pickup apparatus 500 undergoes the operation verification by connecting it to the above-described inspection apparatus before it is shipped from a factory. At that time, in order to generate frequency signals corresponding to various types of shakes, a plurality of dividing ratios are sequentially set to the frequency divider 124. The inspection apparatus compares the verifying signal (waveform A) inputted to point A with the observation signal (waveform B) at point B. The state in which the equalizer 110 is operating ideally is that there is no phase difference between the verifying signal (waveform A) and the observation signal (waveform B), and the amplitudes of these signals are opposite in polarity and equal to each other. If the phase difference therebetween and the amplitude thereof each lies within a predetermined allowable range, the inspection apparatus will determine the equalizer 110 to be in normally operating condition.

The inspection apparatus detects the observation signal (waveform C) at point C while a verifying-signal (waveform A) is inputted to point A. The ideal state is that the amplitude value of observation signal at this point C is kept constant. If the amplitude value of observation signal at this point C lies within a predetermined allowable range, the inspection apparatus will determine the vibration detecting element 16, the equalizer 110 and the driver element 20 to be in normally operating condition. Note that, in these operation verifications, the inspection apparatus may be able to create various conditions by changing the gain, which is set to the amplitude adjustment circuit 125, as appropriate.

By employing the present embodiment as described above, the verifying-signal input circuit 120 is provided in the vibration correction control circuit 100, so that a state in which the vibration is applied to the image pickup apparatus 500 can be created in a simulated manner. Thus, the operations of the structural components related to a vibration correction system of the image pickup apparatus 500 can be verified without the use of a mechanical shaker. More specifically, the structural components related to the vibration correction system of the image pickup apparatus 500 are the vibration detecting element 16, the equalizer 110 and the driver element 20.

In a vibration correction control circuit employing the lens-shift method or image pickup element method, the observation signal at point C in the present embodiment corresponds to a signal outputted from a position detecting element such as a hall element. If the verifying-signal input circuit according to the present embodiment is provided in the vibration correction control circuit and also a sine wave is inputted to the equalizer in the vibration correction control circuit, the operations of the equalizer, the driver element and the position detecting element can be verified but the operation of the vibration detecting element cannot be verified. To verify the operation of the vibration detecting element and inspect the wiring, vibration must be actually applied using the mechanical shaker. In this regard, by employing the present embodiment, the operations of all the structural components related to a vibration correction system can be verified based on the verifying signal generated by the verifying-signal input circuit 120. Thus, the verification cost can be reduced without using the mechanical shaker.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

Figure 4:
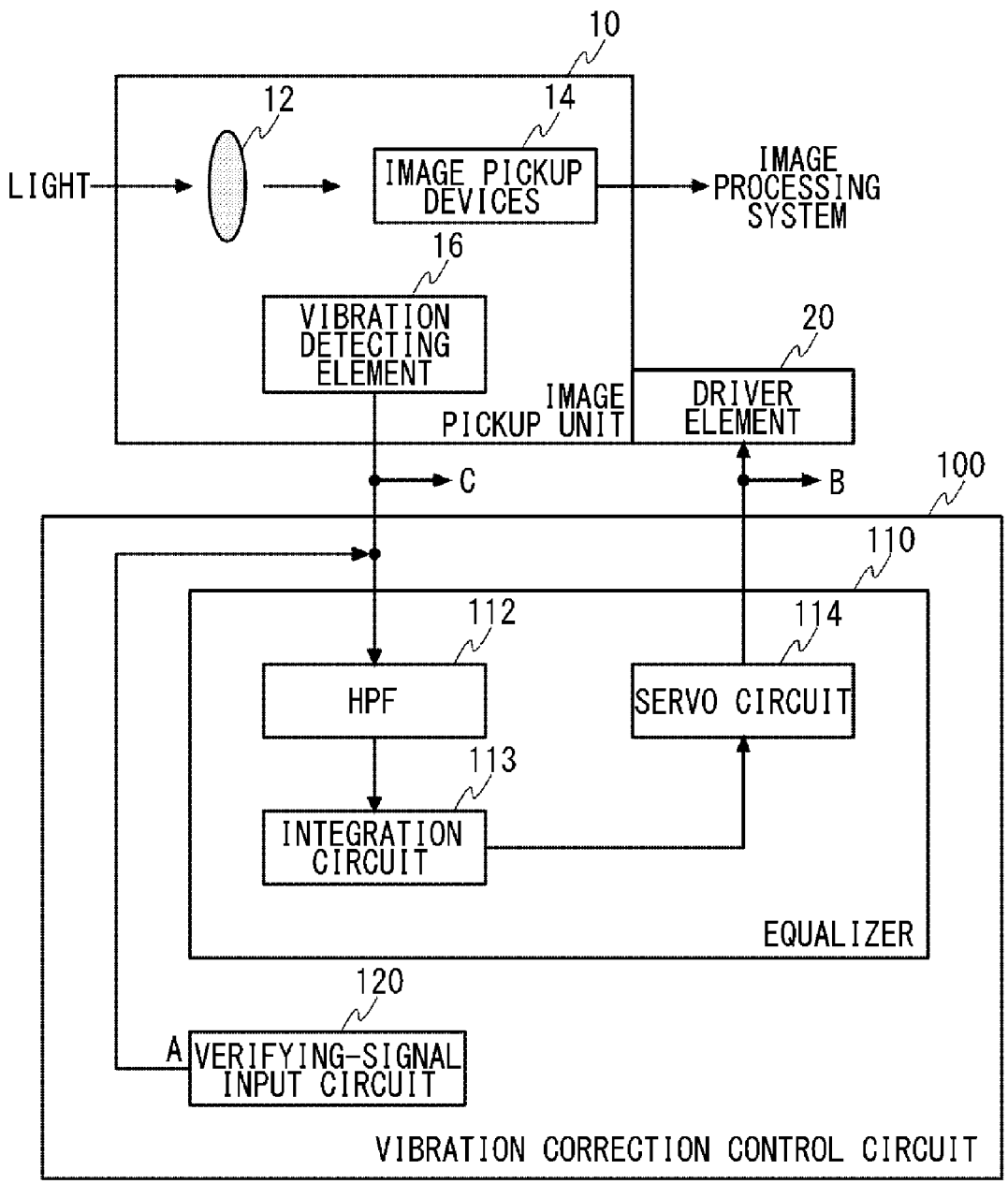
FIG. 4 illustrates a structure of an image pickup apparatus provided with a vibration correction control circuit according to a first modification.

FIG. 4 illustrates a structure of an image pickup apparatus 500 provided with a vibration correction control circuit 100 according to a first modification. Compared with the vibration correction circuit 100 shown in FIG. 1, the vibration correction control circuit 100 according to the first modification is configured such that an integrating circuit 113 is additionally provided in the equalizer 110.

The integrating circuit 113 integrates angular velocity signals inputted from the HPF 112, thereby generates an angular signal and outputs the thus generated angular signal to a servo circuit 114. The servo circuit 114 generates a signal, used to cancel out vibration components due to a shake, which is identified by the angular signal inputted from the integrating circuit 113.

Compared with the vibration correction control circuit 100 shown in FIG. 1, the vibration correction control circuit 100 according to the first modification has the signal pass through the integrating circuit 113 and therefore the vibration occurring in the image pickup unit 10 can be processed as an angular signal. In other words, the vibration correction control circuit 100 according to the first modification can generate the signal used to cancel out the vibration components, based on an amount of movement of the image pickup unit 10.

Figure 5:
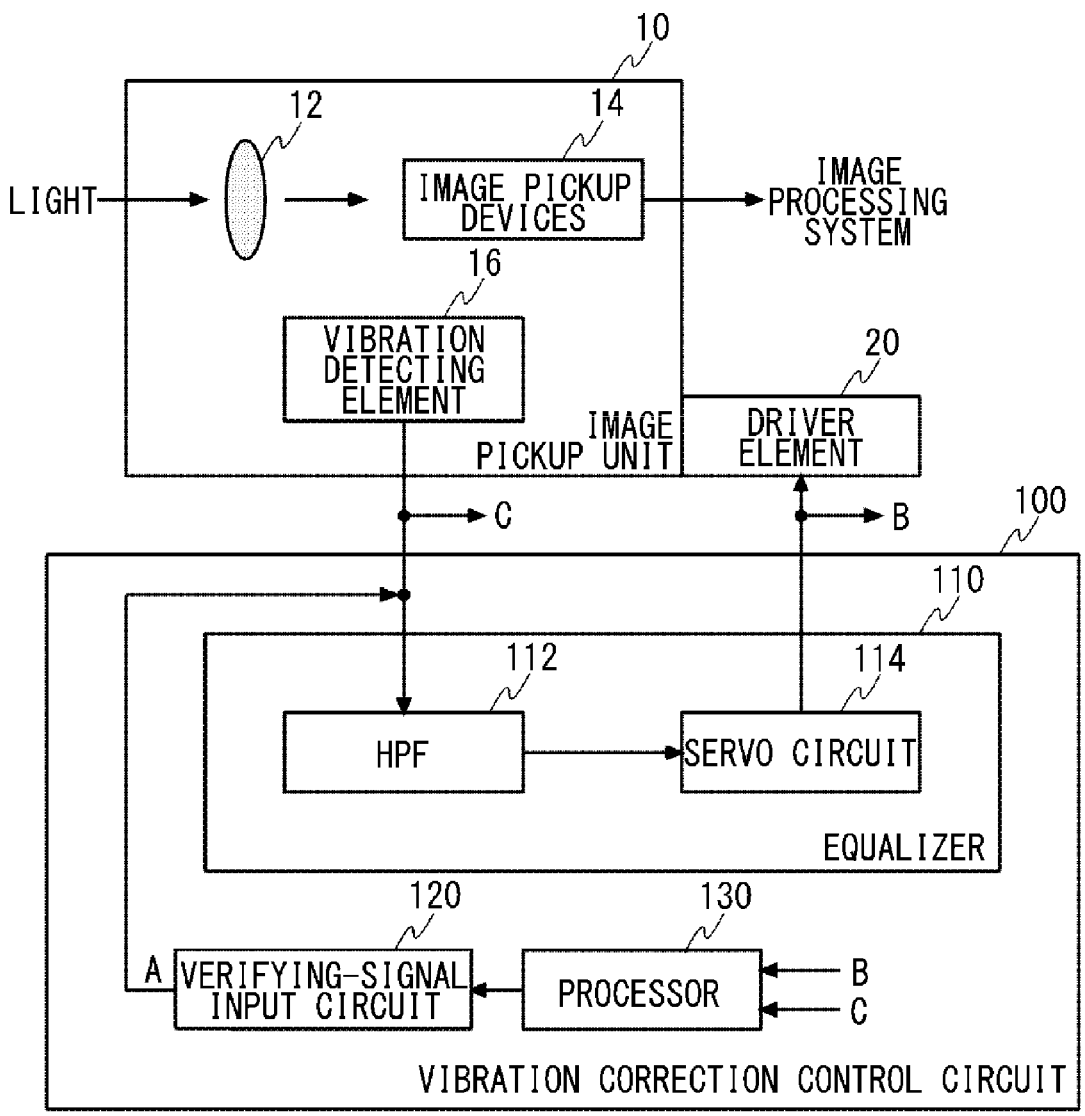
FIG. 5 illustrates a structure of an image pickup apparatus provided with a vibration correction control circuit according to a second modification.

FIG. 5 illustrates a structure of an image pickup apparatus 500 provided with a vibration correction control circuit 100 according to a second modification. Compared with the vibration correction circuit 100 shown in FIG. 1, the vibration correction control circuit 100 according to the second modification is configured such that a processor 130 such as CPU or DSP is additionally provided. The processor 130 can perform the same function as the above-described inspection apparatus. In this case, there is no need to get connected to an externally provided inspection apparatus and therefore the inspection efficiency can be enhanced.

In the above-described embodiments, the vibration detecting element 16 and the driver element 20 function as a gyro sensor and a voice coil motor, respectively, but the embodiments are not limited thereto. For example, a structure may be such that the vibration detecting element 16 detects the vibration of the image pickup apparatus 500, based on an acceleration signal, by the use of a sensor for detecting the acceleration in the rectilinear direction. Also, a piezo element, a stepping motor or the like may be used for the driver element 80.

What is claimed is:

1. A vibration correction control circuit installed in an image pickup apparatus including: an image pickup unit provided with a lens, image pickup devices and a vibration detecting element; and a driver element for adjusting the position of the image pickup unit, the vibration correction control circuit comprising:
an equalizer configured to generate a drive signal used to move the image pickup unit in a direction along which to reduce vibration applied to the image pickup unit, based on an output signal of the vibration detecting element, and configured to output the drive signal to the driver element; and a verifying-signal input circuit configured to input a dummy vibration-component signal to said equalizer.

2. A vibration correction control circuit according to claim 1, wherein said verifying-signal input circuit inputs a sine wave to said equalizer as the vibration-component signal.

3. A vibration correction control circuit according to claim 2, wherein said verifying-signal input circuit is capable of adjusting at least one of the amplitude of the sine wave and the frequency thereof, according to an instruction given externally.

4. An image pickup apparatus, comprising:

an image pickup unit including a lens, image pickup devices, and a vibration detecting element;

a driver element for adjusting the position of said image pickup unit; and a vibration correction control circuit according to claim 1, wherein said driver element moves said image pickup unit, according to a drive signal supplied from said vibration correction control circuit.

* * * * *